(12) United States Patent
Li et al.

(10) Patent No.: US 7,353,166 B2
(45) Date of Patent: Apr. 1, 2008

(54) METHOD AND RECEIVER FOR PROVIDING AUDIO TRANSLATION DATA ON DEMAND

(75) Inventors: Hui Li, Hannover (DE); Karsten Rittner, Hannover (DE)

(73) Assignee: Thomson Licensing, Boulogne Billancourt (FR)

( * ) Notice: Subject to any disclaimer, the term of this patent is extended or adjusted under 35 U.S.C. 154(b) by 830 days.

(21) Appl. No.: 09/829,245

(22) Filed: Apr. 9, 2001

(65) Prior Publication Data

US 2001/0044726 A1    Nov. 22, 2001

(30) Foreign Application Priority Data

May 18, 2000    (EP) .................................. 00250152

(51) Int. Cl.
G06F 17/20    (2006.01)
G10L 11/00    (2006.01)

(52) U.S. Cl. ..................... 704/8; 704/270.1; 704/277

(58) Field of Classification Search ............... 704/277, 704/270; 348/12, 515
See application file for complete search history.

(56) References Cited

U.S. PATENT DOCUMENTS

| | | | | |
|---|---|---|---|---|
| 5,353,121 A | * | 10/1994 | Young et al. | 725/52 |
| 5,815,634 A | * | 9/1998 | Daum et al. | 386/96 |
| 5,900,908 A | * | 5/1999 | Kirkland | 348/62 |
| 5,982,448 A | | 11/1999 | Reyes | 348/552 |
| 6,070,167 A | * | 5/2000 | Qian et al. | 707/102 |
| 6,189,045 B1 | * | 2/2001 | O'Shea et al. | 709/246 |
| 6,209,028 B1 | * | 3/2001 | Walker et al. | 709/219 |
| 6,317,795 B1 | * | 11/2001 | Malkin et al. | 709/246 |
| 6,341,108 B1 | * | 1/2002 | Ishizuka | 369/47.1 |
| 6,513,003 B1 | * | 1/2003 | Angell et al. | 704/235 |
| 6,542,200 B1 | * | 4/2003 | Barcy et al. | 348/468 |
| 6,661,466 B1 | * | 12/2003 | Kou | 348/553 |
| 6,710,815 B1 | * | 3/2004 | Billmaier et al. | 348/515 |
| 6,816,468 B1 | * | 11/2004 | Cruickshank | 370/260 |
| 6,845,399 B2 | * | 1/2005 | Agraharam et al. | 709/231 |
| 6,944,585 B1 | * | 9/2005 | Pawson | 703/22 |

FOREIGN PATENT DOCUMENTS

| | | |
|---|---|---|
| DE | 19713490 A1 | 10/1997 |
| DE | 19713490 A1 | 10/1997 |

* cited by examiner

*Primary Examiner*—David Hudspeth
*Assistant Examiner*—Brian L. Albertalli
(74) *Attorney, Agent, or Firm*—Joseph J. Laks; Harvey D. Fried; Joel M. Fogelson

(57) ABSTRACT

Video data are transmitted to a receiver. A language menu is displayed from which a user selects a language that can be different from the original language broadcast with the video data. Video data identification information and language identification information corresponding to the language selected from the menu is derived and transmitted to e.g. an Internet server. The identification information is used to select an audio translation data set from several audio translation data sets stored in said server, wherein each of said several audio translation data sets includes a language translation of original audio data related to said video data. The selected audio translation data set is sent to the receiver and reproduced synchronously together with said video data.

9 Claims, 1 Drawing Sheet

METHOD AND RECEIVER FOR PROVIDING AUDIO TRANSLATION DATA ON DEMAND

FIELD OF THE INVENTION

The invention relates to the field of providing audio translation data on demand to a receiver.

BACKGROUND OF THE INVENTION

The number of television (TV) channels a user can receive has increased significantly because of the further development of terrestrial TV, satellite TV and web TV technology including digital TV transmission. In addition, video media, such as cassette, CD and DVD offer more programs or movies to the home.

SUMMARY OF THE INVENTION

The above developments lead also to an increased share of foreign language programs or movies.

In an increasing number of countries or geographical regions there are multi-language requirements: there may be used more than one native language in one country or region, or non-native residents prefer to have their native language for home-entertainment. Therefore there is a growing need for broadcasting programs or movies with audio data or subtitles corresponding to a language translation preferred by the respective consumers.

A problem to be solved by the invention is to provide audio or subtitle translation data on demand.

One aspect of the invention is a method for providing audio or subtitle translation data on demand to a receiver, the method including the following steps:
receiving video data;
receiving first identification information corresponding to said video data;
detecting a user-performed selection of a preferred language;
providing second identification information corresponding to said preferred language;
transmitting, e.g. via Internet, third identification information derived from said first and second identification information to a server for requesting, based on said third identification information, a desired audio or subtitle translation data set corresponding to said video data;
receiving, e.g. via Internet, said selected audio or subtitle translation data set;
reproducing, at least partly, data of said requested audio or subtitle translation data set temporally synchronised with said video data.

According to another aspect, the invention concerns a receiver for providing audio or subtitle translation data on demand, the receiver including:
means for receiving video data and first identification information corresponding to said video data;
means for detecting a user-performed selection of a preferred language;
means for providing second identification information corresponding to said preferred language;
means for transmitting, e.g. via Internet, third identification information derived from said first and second identification information to a server for requesting, based on said third identification information, a desired audio or subtitle translation data set corresponding to said video data;
means for receiving, e.g. via Internet, said selected audio or subtitle translation data set;
means for reproducing, at least partly, data of said requested audio or subtitle translation data set temporally synchronised with said video data.

According to a further aspect, the invention concerns a method for providing audio or subtitle translation data on demand, including the steps:
receiving, e.g. via Internet, identification information requested by a user, wherein said identification information corresponds to a preferred language and to video data that are originally accompanied by audio or subtitle data in a language different from said preferred language;
storing or generating audio or subtitle translation data sets assigned to different languages for related video data, wherein each of said audio or subtitle translation data sets includes a language translation of original language audio or subtitle data related to specific ones of said video data;
selecting, upon receiving said identification information, an audio or subtitle translation data set, wherein the selected audio or subtitle translation data set represents a language translation of said original language audio or subtitle data corresponding to said preferred language,
transmitting, e.g. via Internet, said selected audio or subtitle translation data set for providing it to a receiver of said user.

The invention is based on the idea that different audio translation data sets are available in an archive, preferably an online archive. The different audio translation data sets can be ordered by a user of a television and/or video system. This allows the user to have a movie or film broadcast with audio signals corresponding to a language preferred him. For example, a visitor staying in a hotel of a foreign country can watch movies provided with audio signals corresponding to his native language.

The invention also allows to watch a movie, scientific programmes etc. in a certain foreign language or with subtitles in a certain foreign language in order to train the user's knowledge of this specific foreign language.

BRIEF DESCRIPTION OF THE DRAWINGS

Exemplary embodiments of the invention are described with reference to the accompanying drawings, which show in.

DETAILED DESCRIPTION OF PREFERRED EMBODIMENTS

Figure 1:
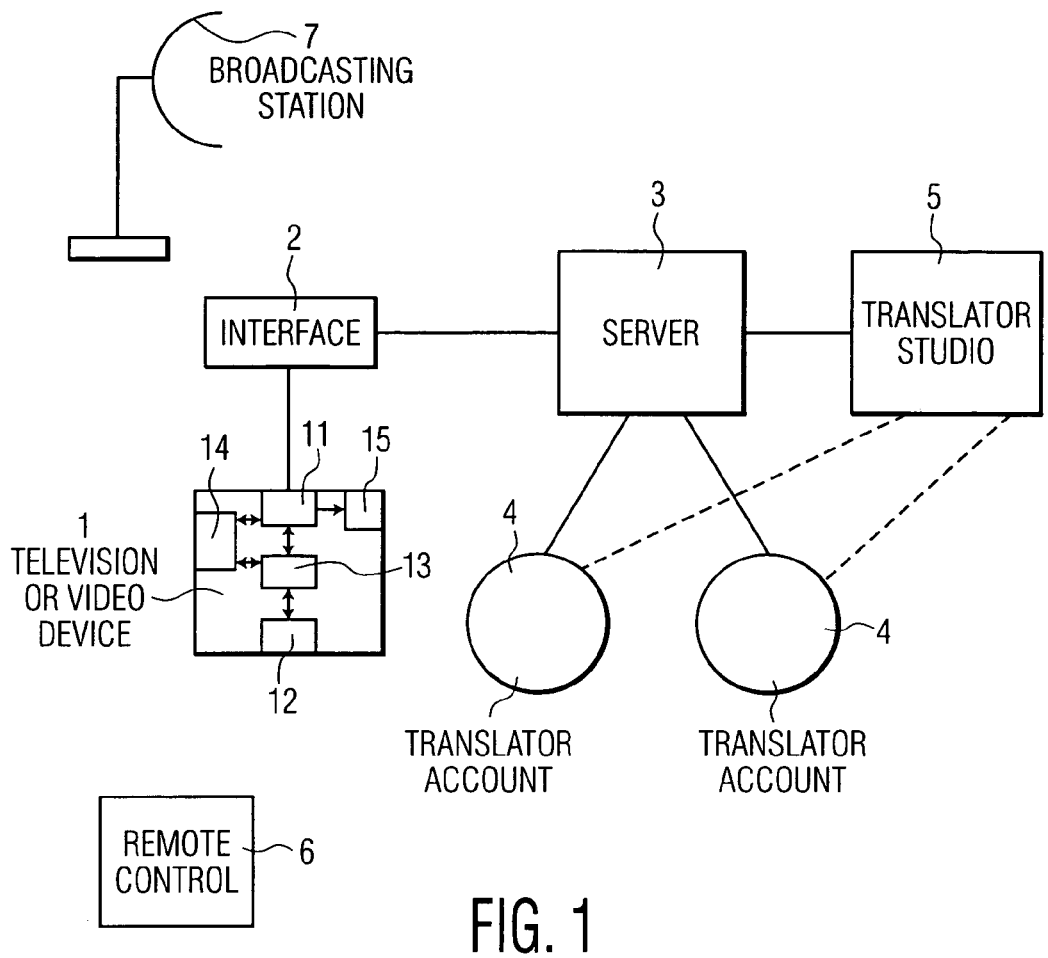
FIG. 1 a schematical representation of a system according to the invention.

Referring to FIG. 1, the invention can be embodied in a system including a television and/or video device 1 for broadcasting a movie or film, an interface 2, and server means 3 to which several translator accounts 4 are assigned. The server means may be any kind of computer for operating a database storing an archive of translation data. The server may be located at the broadcast station supplying the movie or film or at a company specialized on the supply of translation data.

The server means may be connected with a translator studio 5. A user may control the television or video device 1 and/or the interface 2 by means of a remote control 6 and/or by voice control. The interface 2 may be contained in the device 1, which device can be e.g. a settop-box or a TV receiver or video recorder.

If a user of the device 1 likes to watch a movie broadcast in any language with audio signals in a preferred language, a language menu can be provided on a display 14 of the device 1. By means of the language menu a list of several language options is presented to the user of device 1, each of the several language options representing audio translation data of a different language and/or from a different translator. From the language menu the user can select a language option corresponding to the language preferred by the user. The selection of the language option may be performed by means of the remote control 6 the transmitted commands of which are received by an IR receiver 12 contained in device 1.

It is also possible to select a preferred language by a spoken command, which is detected by a microphone. This microphone can be integrated in the remote control or in the housing of the device 1.

Furthermore, it is possible to select not only one preferred language but a most preferred language and a second most preferred language. In order to make this more clear, the following example is given. If for instance a German user stays e.g. in China and is not familiar with the Chinese language but with e.g. the English language, he may choose German as the most preferred language and English as the second most preferred language. In this way, the German user will get translation data in German language, if these are available. If not, he will receive translation data in English language, if these are available. Only if neither German nor English translation data is available, he has to watch the movie with the original language.

The user's selection of the language option is evaluated in means 13 for providing identification information corresponding to the preferred language and the video data of the movie the user intends to watch. The identification information is automatically passed using controlling means 11 to an output of device 1, which output may be connected to the Internet or any other source providing data to the user's device. The identification information may include the title of the movie or some other identification code extracted from VPS data, teletext data, MPEG7 data or an EPG (Electronic Program Guide).

The identification information is transmitted to a server 3, preferably through an interface 2 with online connection like an ISDN connection or any other Internet or cable connection. After processing the identification information the server 3 will supply audio translation data to the interface 2 via a back channel or via the Internet or cable. The audio translation data may be compressed, e.g. by means of MP3 or MPEG4 standard. The device 1 will provide video data received from a broadcasting station 7 in synchronization with the audio translation data received from server 3, so that the user can watch the movie with audio signals and/or subtitles corresponding to the language preferred by him.

Also it is possible that the server sends back only an information about the availability of the languages of audio signals and/or subtitles for the selected title. This information can be accompanied by an information about the cost for downloading the translation data. The information about the available languages can be displayed by a second on-screen display, possibly together with the cost. The user then finally decides whether he wants downloading of the translation data.

The controlling means 11 may control synchronization of the video data and the audio translation data by means of time stamps provided in the video data as well as the audio translation data. If the video data are encoded according to the MPEG-4 standard, resynchronization marker codes, which are inserted in the video data stream at certain intervals, can be used for synchronization. If the audio data are also MPEG-4 encoded, not the total audio signal but only the voices to be translated can be transmitted due to the object oriented transmission. This allows a very low transmission bit rate.

The audio translation data provided to device 1 may be intermediately stored at least partly, e.g. on a hard disc or other storage devices.

In the means 13 for providing identification information, or in the controlling means 11, the user's language selection, or selections, may be stored permanently or for a predetermined period of time so that, always or during the predetermined period of time, audio translation data corresponding to the stored preferred language selection will be automatically delivered to the device 1 whenever the user wants to watch a movie, without it being necessary to display the language menu on the display 14. For example, for a period staying in a hotel abroad, a visitor will have the opportunity to watch movies in the hotel with audio translation data corresponding to his native language, if a respective language selection made by the visitor is stored.

The service of providing translation data on demand may be free of charge or charged, wherein the user's payment can be controlled by means of the interface 2 or controlling means 11.

Figure 2:
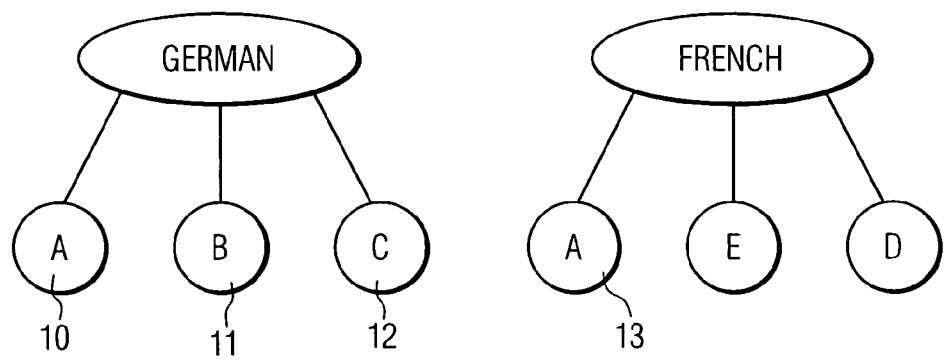
FIG. 2 a simplified block diagram of an online translation archive.

Referring to FIG. 2, in the server means 3 the audio translation data are arranged e.g. in translator accounts 10, 11, 12, each being related to a translator A, B and C, respectively, as schematically shown in FIG. 2. A translator A may have a respective account for German (account 10 in FIG. 2), English, French (account 13 in FIG. 2) and/or other languages. There may be more than one set of audio translation data available in the server means 3, each set representing, for example, a German translation for a specific movie and generated by a different translator, giving the user the opportunity to select German audio translation data for the specific movie from a preferred translator.

Translators may generate audio translation data in the translator studio 5. The translator studio 5 provides a user-friendly website interface, technical support and translation guidance to the translators. An online connection may be established between the translator studio 5 and the server means 4 to transmit audio translation data. The translator may set up a new translator account, add new audio translation data to the account 4 or delete previous version from the account 4. Audio translation data may be stored as text and/or voice data. In addition, the translator studio 5 may provide online payment to the translators.

It is possible to assign the required functions to different units: for instance, providing identification information can be accomplished in interface 2 whereby means 13 can be omitted and IR receiver 12 is connected directly to controlling means 11.

The audio or subtitle translation data set mentioned above can be a data set including the complete sound track/subtitle track of one program or one movie.

In connection with recording a program or movie using programming, in particular VPS or ShowView programming, it is advantageous to either automatically download and intermediately store the audio or subtitle translation data set in advance, or to download and record the audio or subtitle translation data set during or after finishing the recording of the related video data and possibly original audio/subtitle data.

What is claimed is:

1. Method for providing audio or subtitle translation data on demand to at least one of a receiver and a video device, the method including the following steps:

said at least one of receiver and video device receiving broadcast video data for a specific program or movie together with at least one of original audio data and subtitle data related to a given language, which video data include:

first identification information data identifying said specific program or movie video data;

detecting a user-performed selection of a preferred language that is different from said given language;

detecting a user-performed selection of a second preferred language that is different from said given language and said preferred language;

providing second identification information corresponding to said preferred language and said second preferred language;

transmitting automatically-third identification information data derived automatically from said first and second identification information data to a server for requesting, based on said third identification information data from said at least one of receiver and video device, a desired at least one of audio translation data set and subtitle translation data set corresponding to said video data and corresponding to said preferred language and said second preferred language; wherein said server will transmit said at least one audio translation data set and subtitle translation data set corresponding to said second preferred language if at least one audio translation data set and subtitle translation data set corresponding to said preferred language is unavailable;

receiving in said at least one of receiver and video device-said selected at least one of audio and subtitle translation data set corresponding to said third identification information data;

reproducing automatically data of said received audio or subtitle translation data set together with said video data that was originally received in said at least one receiver and video device in a temporally synchronized manner, instead of reproducing said original audio data related to a given language with said video data, wherein said reproduced at least one of audio translation data and subtitle translation data set represents, corresponding to at least one of said preferred language and said second preferred language, a language translation of said at least one of original language audio and subtitle data, otherwise if said preferred language and said second preferred language are not available, said reproducing step uses said audio or subtitled translation data set originally received.

2. Method according to claim 1, further comprising the step of displaying a language menu and detecting the user-performed selection of the preferred language and said second preferred language from said language menu.

3. Method according to claim 1, wherein from several available server-stored audio or subtitle translation data sets one is selected, wherein each of said several audio or subtitle translation data sets includes a language translation of original language audio or subtitle data related to said video data, and wherein the selected audio or subtitle translation data set represents, corresponding to said preferred language or said second preferred language, a language translation of said original language audio or subtitle data.

4. Method according to claim 1, wherein said user-performed selection is detected, and said provided second identification information corresponding to said preferred language and said second preferred language is stored, before said video data are received.

5. Method according to claim 4, wherein said video data are recorded using programming and wherein said audio or subtitle translation data set is either automatically downloaded and intermediately stored in advance, or is downloaded and recorded after finishing the recording of the related video data and at least one of said original audio and subtitle data.

6. Method according to claim 1, wherein time stamps are used for synchronizing said video data with the data of said requested or selected audio or subtitle translation data set.

7. Method according to claim 6, wherein
the data are MPEG-4 encoded and resynchronization marker codes are used for synchronizing; and said received audio data represents only the voice audio of said program such that said data only replaces voice audio that is part of the original audio of said program.

8. Method according to claim 1, wherein said first identification information is automatically provided from corresponding teletext or MPEG7 information.

9. Method according to claim 1, wherein said third identification information data are transmitted via an Internet connection to said server, and wherein said at least one of audio and subtitle translation data set corresponding to said third identification information data are received via said Internet connection.

* * * * *